(12) United States Patent
Peterlechner et al.

(10) Patent No.: US 6,612,048 B2
(45) Date of Patent: Sep. 2, 2003

(54) ANGULAR POSITION MEASURING SYSTEM

(75) Inventors: Andreas Peterlechner, St. Radegund (AT); Gotthard Lepperdinger, St. Georgen (AT)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/001,065

(22) Filed: Nov. 30, 2001

(65) Prior Publication Data
US 2002/0083769 A1 Jul. 4, 2002

(30) Foreign Application Priority Data
Nov. 30, 2000 (AT) ............................................ 2013/2000

(51) Int. Cl.[7] ................................................ G01B 3/10
(52) U.S. Cl. ............................ 33/755; 33/1 PT; 33/706
(58) Field of Search ............................... 33/1 AP, 1 N, 33/1 PT, 373, 494, 534, 555.1, 679.1, 755, 759, 771, 706

(56) References Cited

U.S. PATENT DOCUMENTS

| | | | | |
|---|---|---|---|---|
| 1,274,293 A | * | 7/1918 | Little .......................... 33/1 N |
| 1,672,913 A | * | 6/1928 | Schaap ...................... 33/555.4 |
| 1,778,981 A | * | 10/1930 | McLaughlin ................ 33/529 |
| 2,191,808 A | * | 2/1940 | Schramm .................... 33/555.4 |
| 3,314,156 A | * | 4/1967 | Van Burkleo ............... 33/555.4 |
| 3,331,134 A | * | 7/1967 | Jackson et al. .............. 33/534 |
| 3,407,507 A | * | 10/1968 | Brubaker .................... 33/555.4 |
| 3,918,166 A | * | 11/1975 | Mason ......................... 33/761 |
| 4,441,258 A | * | 4/1984 | McDaniel et al. .......... 33/759 |
| 4,922,622 A | * | 5/1990 | Galloway .................... 33/555.4 |
| 5,774,999 A | * | 7/1998 | Smith .......................... 33/759 |
| 6,098,295 A | * | 8/2000 | Feichtinger ................. 33/1 PT |
| 6,481,115 B1 | * | 11/2002 | Henshaw et al. ............ 33/706 |

FOREIGN PATENT DOCUMENTS

| | | |
|---|---|---|
| DE | 37 51 019 | 12/1988 |
| DE | 43 31 668 | 3/1995 |
| DE | 196 11 983 | 7/1997 |
| DE | 197 51 019 | 6/1999 |

OTHER PUBLICATIONS

X—"Digitale–Langen–und Winklmeβtechnik" [Digital Linear And Angular Measurement Technology], Alfons Enst, Technical Library, vol. 165, Moderne Industrie Publishing House, 1998, pp. 69–70. (no month).

* cited by examiner

Primary Examiner—G. Bradley Bennett
(74) Attorney, Agent, or Firm—Kenyon & Kenyon

(57) ABSTRACT

An angular position measuring system has a measuring tape including an adjusting device, the measuring tape being attached via an elastic layer to a clamping ring. A clamping device allows the arrangement to be attached to a body to be measured. Thus, the adjustment of the distance between the ends of the measuring tape is independent of the attachment of the measuring tape to the shaft. The elastic layer largely prevents the transfer of friction-dependent, local expansions of the clamping ring. The demands on the surface processing of the shaft are reduced in comparison with the related art.

13 Claims, 2 Drawing Sheets

ANGULAR POSITION MEASURING SYSTEM

FIELD OF THE INVENTION

The present invention relates to an angular position measuring system. Specifically, the invention relates to angular position measuring systems used above all when large radii are used for the angular position measurement, e.g., for rotary tables or telescopes.

BACKGROUND OF THE INVENTION

To measure the angular position, a graduated measuring tape, usually of steel, is fastened around the circumference of an object to be measured. If the measurement is to be performed over a full 360 degrees, care should be taken that, in the case of a measurement beyond the joint of the two ends of the measuring band, no measuring error results from a potentially existing space in the graduation.

In measuring angular position, it is known to insert a steel band having graduation marks into the groove of a graduation wheel and tension the steel band via a turnbuckle. See, e.g., "Digitale Längen- und Winkelmeßtechnik" [Digital Linear and Angular Measurement Technology], Alfons Ernst, Technical Library, Volume 165, Moderne Industrie Publishing House, 1998, pages 69–70. However, tensioning results in tangential frictional forces between the measuring tape and the graduated wheel on the periphery of the graduation wheel. Oftentimes, the frictional forces expand the measuring tape to different extents along its periphery, thereby potentially causing deviations in the angular position measurement. If one also wants to adjust the joint between the measuring tape ends such that there is no jump in the scanned signal at this point, the tension force is not to account for conditions such as centrifugal forces, but should instead correspond to the necessary adjusting force.

The present applicants' prior application DE 19751019 A1 describes an angular position measuring system wherein a device is used to introduce the same tension force at both ends of the measuring tape. This results in a reduction in the angle error caused by irregular expansion or compression of the measuring tape as compared to systems wherein one end of the measuring band is fixedly connected to its base and a tension force is only exerted on the second end. It is further proposed to provide an elastic layer to reduce the friction between the measuring tape and the base. In the case of the proposed design approach, it is disadvantageous, on the one hand, that it cannot be used for systems that must measure a complete rotation around 360 degrees, and, on the other hand, that further force is exerted directly on the measuring tape by the clamping device. Thus, regions of the measuring tape having different expansions result due to the further occurrence of frictional forces.

SUMMARY OF THE INVENTION

It is the object of the present invention to provide an angular position measuring system having a measuring tape, where the joint adjustment of the ends of the measuring tape is largely independent of the mounting of the measuring tape on the body to be measured.

This object is achieved by an angular position measuring system for measuring a body to be measured. The system includes a measuring tape having an adjusting device for adjusting a joint between both ends of the measuring tape. It also has an elastic layer. The measuring tape is attached to the elastic layer. The elastic layer is elastic in at least a radial direction. The system also includes a clamping ring. The elastic layer is attached to the clamping ring. The clamping ring has a clamping device for attaching the measuring tape to the body to be measured.

The proposed angular position measuring system includes a measuring tape having a graduation, the measuring tape being attached via a layer, which is elastic in the radial and tangential direction, to a separate clamping ring. Advantageously, an adjusting device can be used to adjust both ends of the measuring tape already during the manufacture of this structure of clamping ring, elastic layer, and measuring tape. For assembly, this structure is then attached via the clamping ring to the body to be measured. In this context, tangential forces, which locally deform the clamping ring, do occur as a result of the friction between the clamping ring and the body surface. The elastic layer does not transfer this deformation or only transfers a small portion of the deformation to the measuring tape. During assembly, the joint adjustment need not be repeated. Both operations are independent. The cost of such an assembly is relatively low. It is understood that the joint can also be adjusted after the clamping ring is assembled. A further positive effect is that smaller deviations from the ideal shaft diameter can be compensated for by the elastic layer, e.g., in the case of attachment to a shaft. Thus, the demands on the workmanship of the shaft are reduced. The measuring tape is attached in a self-centering manner.

BRIEF DESCRIPTION OF THE DRAWINGS

FIG. 3b shows another embodiment of the angular position measuring system shown in FIG. 3a.

DESCRIPTION OF THE PREFERRED EMBODIMENT

Figure 1:
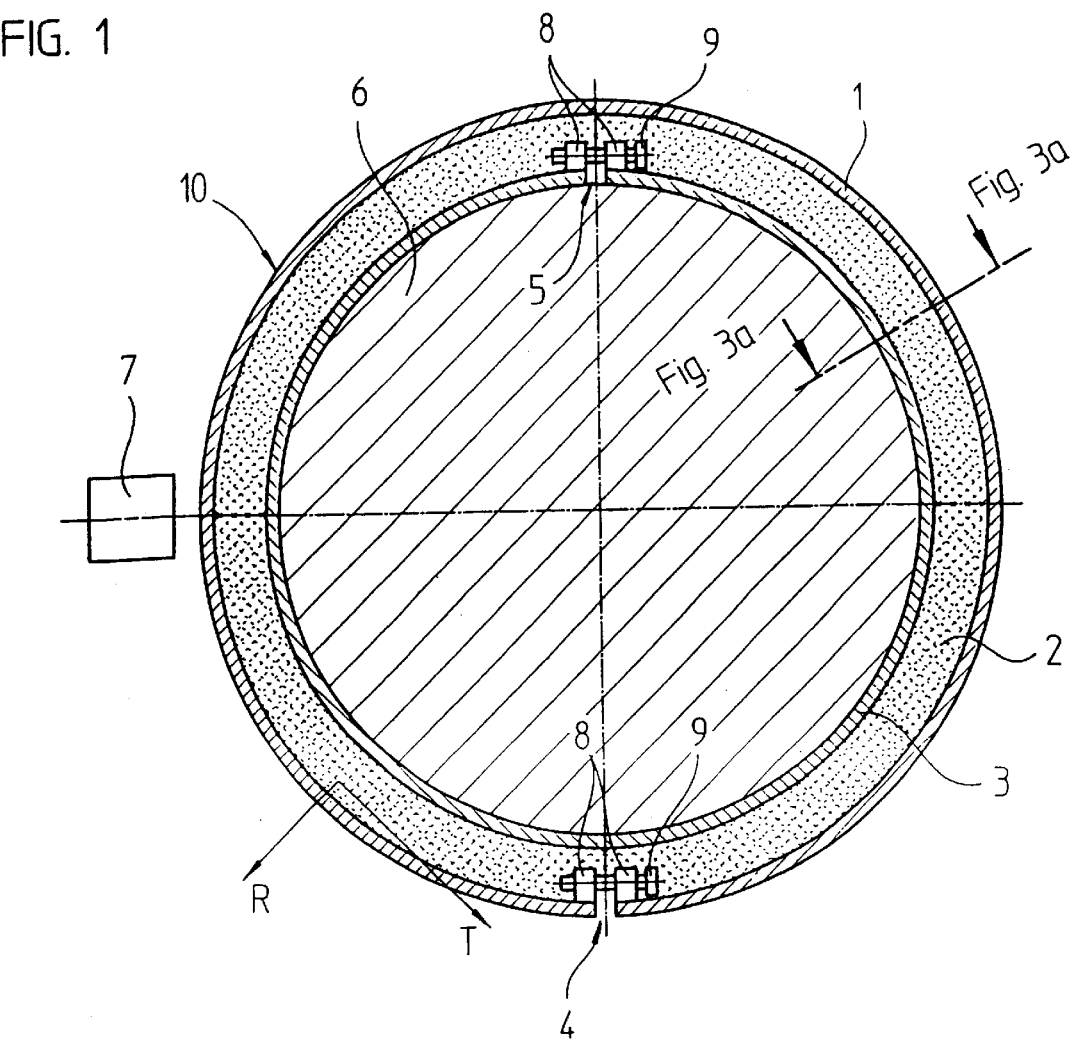
FIG. 1 is a top view of an angular position measuring system mounted on a shaft.
Figure 2:
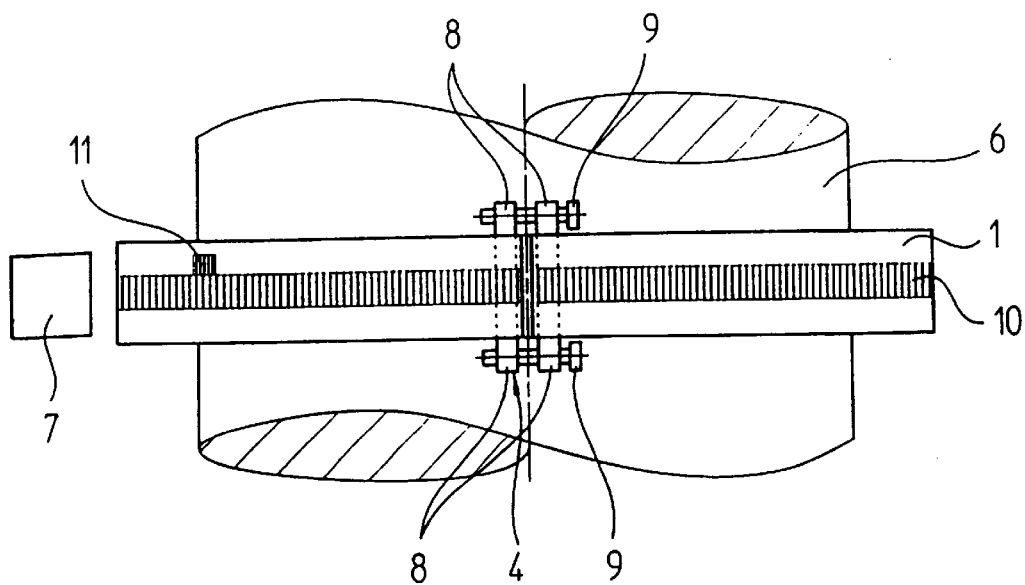
FIG. 2 is a side view of the angular position measuring system shown in FIG. 1.

FIGS. 1 and 2 respectively show a top view and a side view of an angular position measuring system installed on a body 6 to be measured. A measuring tape 1 having a graduation 10, can consist of, for example, a steel band. Graduation 10 can be applied, for example, by stamping or using a lithographic procedure. Graduation 10 is scanned by a read head 7, whose signals can be evaluated by an electronics package (not shown) and converted into an angular position. To obtain absolute angle data, a reference mark 11 can be read in addition to graduation 10, or a multi-track, absolute graduation can also be used.

Measuring tape 1 is fastened to an elastic layer 2, e.g. by bonding, in order to measure the angular position of a body 6 to be measured. Body 6 is also referred to as shaft 6, however, it is understood that body 6 can be any suitable object requiring measurement by the system. Elastic layer 2 can be fabricated from double-sided acrylate-foam adhesive tape, for example, or of elastomers such as silicon gum. It is advantageous that this elastic layer 2 is elastic in tangential direction T and radial direction R. Elastic layer 2 is attached to a clamping ring 3, which is attached via its clamping device 5 to shaft 6.

Both ends of measuring band 1 can be joined via adjusting device 4 and adjusted relative to each other so that graduation 10 is not interrupted at the joint. So that the ends meet evenly it is advantageous to process both ends prior to assembly accordingly.

In one embodiment, adjusting device 4 and clamping device 5 have an identical design and are situated opposite to one another on shaft 6. Thus, there is no imbalance when the shaft rotates. FIGS. 1 and 2 show a possible design of adjusting device 4 and clamping device 5. The ends of measuring tape 1 and clamping ring 3 are respectively attached to adjusting blocks 8, whose distances are each adjusted via adjusting screws 9. The radial expansion of adjusting device 4 and clamping device 5 should not exceed the radial thickness of the elastic layer. This allows a small distance from read head 7 to graduation 10, and thus, no cut-outs are necessary on shaft 6. Adjusting device 4 and clamping device 5 should, therefore, also be situated in the region of elastic layer 2, as shown in FIG. 1.

A significant advantage in comparison with the related art is that in the described arrangement, the adjustment of the joint between the ends of measuring tape 1 is completely independent of the attachment of measuring tape 1 to shaft 6. The joint can, in fact, be adjusted by the manufacturer of measuring band 1. The customer can then carry out the simple final assembly via clamping ring 3 without again changing the joint of the measuring tape. Of course, the joint can also be adjusted after assembly, without loosening mounted clamping ring 3.

A layer 2, which is elastic in tangential direction T, also results in an adjustment of local expansions of clamping ring 3, which occur as a result of friction between clamping ring 3 and shaft 6 when clamping device 5 is manipulated. These expansions of clamping ring 3 are taken up by elastic layer 2 due to its elasticity in tangential direction T and are compensated for to the greatest possible extent.

Figure 3A:
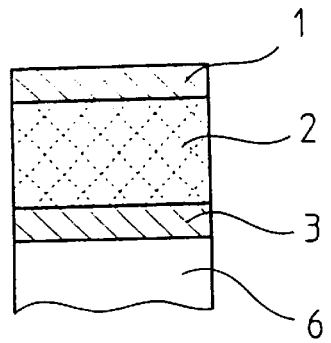
FIG. 3a is a section of the angular position measuring system through lines III—III in FIG. 1.
Figure 3B:
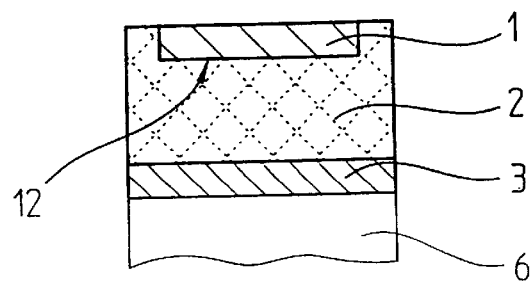

This effect can be amplified as needed when measuring tape 1 is not simply fixedly connected to elastic layer 2 as in FIG. 3a, but measuring tape 1 and elastic layer 2 form a slide pairing 12 as in FIG. 3b. This measure is particularly useful when an elasticity of elastic layer 2 in tangential direction T does not exist or is not sufficient. To maintain stability in the axial direction in this instance, it can be advantageous to form a groove in elastic layer 2, the groove accommodating measuring tape 1. Slide pairing 12 can be produced, for example, in that a Teflon band (not shown) is inserted between measuring tape 1 and elastic layer 2. Measuring tape 1 can slide on this Teflon band during the joint adjustment via adjustment device 4 as well as when tensioning clamping ring 3, thereby uniformly distributing tension over the entire circumference of measuring tape 1. A further possibility for forming a slide pairing 12 would be the use of two strips that adhere via a viscous intermediate film, one of the strips already being capable of forming measuring tape 1. Such an arrangement is described in detail in DE 19611983 C1 and is wholly incorporated herein by reference.

However, there are even further advantages to the described arrangement. Due to its elasticity in radial direction R, elastic layer 2 thus compensates for smaller deviations from the circular shape of shaft 6. The required workmanship of the surface of shaft 6 is, therefore, reduced in comparison with a direct attachment of measuring tape 1 to shaft 6. In this context, elastic layer 2 also results in a self-centering of measuring tape 1 with respect to the axis of shaft 6.

Figure 4:
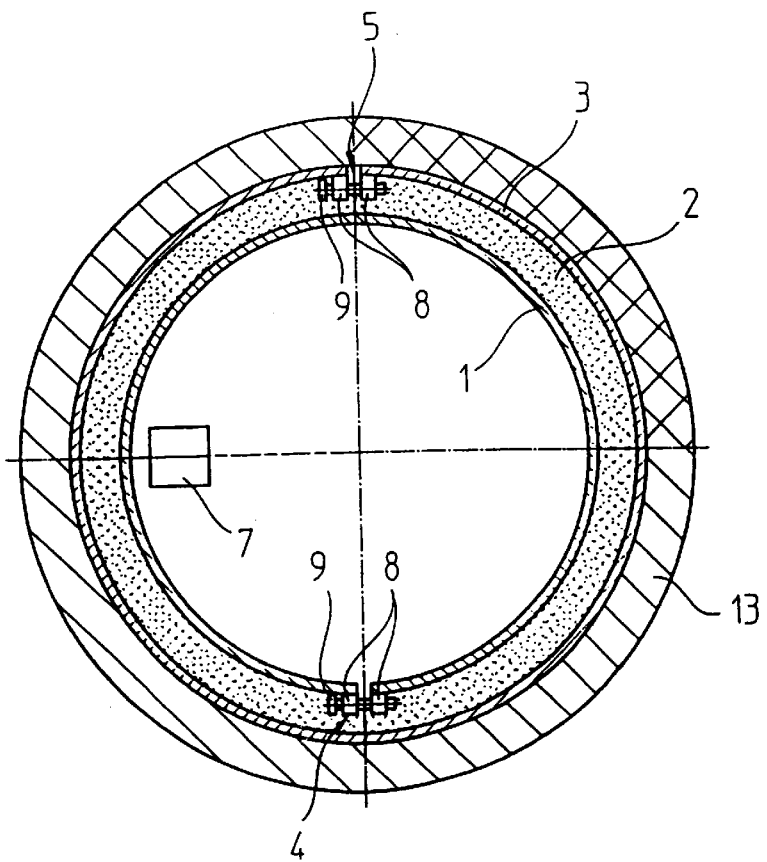
FIG. 4 is a top view of an angular position measuring system mounted on a hollow shaft.

A further use of the invention is described on the basis of FIG. 4. In some cases, it is advantageous to attach a measuring tape to an inside diameter of a hollow shaft 13. Measuring tape 1 and read head 7 are then protected by hollow shaft 13 from contamination or damage. The design is very similar to that in FIG. 1 except that the sequence of clamping ring 3, elastic layer 2, and measuring tape 1 is reversed, so that the latter is closest to the axis of hollow shaft 13, and graduation 10 is oriented to read head 7, which is now on the inside. To secure measuring tape 1 in hollow shaft 13, clamping device 5 must now apply pressure to clamping ring 3. All of the advantages described in the case of the previous arrangement having measuring tape 1 on the outside are also given in the same manner in the arrangement according to FIG. 4.

It should also be mentioned that it could be necessary to connect measuring tape 1 in a torsionally rigid manner to shaft 6 (or hollow shaft 13) after assembly is complete in order to prevent graduation 10 from rotating relatively to shaft 6. Elasticity in tangential direction T of elastic layer 2 renders such a movement possible, e.g. in response to an acceleration of the rotary motion of the shaft. In the event that one or more reference marks 11 are present, it is preferable to fix measuring tape 1, especially at these points.

The present invention is suitable for measuring tapes 1 and read heads 7 of many different types that are based, for example, on optical, magnetic, capacitive, or inductive principles. And, while the foregoing description and drawings represent the preferred embodiments of the present invention, it will be apparent to whose skilled in the art that various changes and modifications may be made therein without departing from the true spirit and scope of the present invention.

What is claimed is:

1. An angular position measuring system for measuring a body to be measured, the system comprising:
    a measuring tape having an adjusting device for adjusting a joint between both ends of the measuring tape;
    an elastic layer, the measuring tape attached to the elastic layer, the elastic layer elastic in at least a radial direction; and
    a clamping ring, the elastic layer attached to the clamping ring, the clamping ring having a clamping device for attaching the measuring tape to the body to be measured.

2. The angular position measuring system as recited in claim 1, wherein the elastic layer is fabricated from one of an acrylate-foam adhesive tape and an elastomer.

3. The angular position measuring system as recited in claim 1, wherein the elastic layer is elastic in a tangential direction.

4. The angular position measuring system as recited in claim 1, wherein the adjusting device and the clamping device have an identical design.

5. The angular position measuring system as recited in claim 1, wherein the adjusting device includes adjusting blocks, the adjusting blocks attached to ends of the measuring tape, and a distance between the blocks adjustable via adjusting screws.

6. The angular position measuring system as recited in claim 1, wherein the adjusting device and the clamping device are situated opposite one another.

7. The angular position measuring system as recited in claim 1, wherein the radial expansion of the adjusting device and the clamping device is equal or less than a thickness of the elastic layer.

8. The angular position measuring system as recited in claim 1, wherein the measuring tape and the elastic layer are fixedly connected to one another.

9. The angular position measuring system as recited in claim 1, wherein the measuring tape and the elastic layer form a slide pairing.

10. The angular position measuring system as recited in claim 1, wherein the clamping ring is attached to an outer periphery of the body to be measured and the ring is subjected to tension by the clamping device, so that the elastic layer and measuring tape form external layers over the body.

11. The angular position measuring system as recited in claim 1, wherein the clamping ring is attached to an inner periphery of the body to be measured and the ring is subjected to compression by the clamping device, so that the elastic layer and measuring tape form internal layers within the body.

12. An angular position measuring system for measuring a body to be measured, the system comprising:

a measuring tape having an adjusting device for adjusting a joint between both ends of the measuring tape;

an elastic layer, the measuring tape attached to the elastic layer, the elastic layer elastic in at least a radial direction; and a clamping ring, the elastic layer attached to the clamping ring, the clamping ring having a clamping device for attaching the measuring tape to the body to be measured, wherein the clamping ring is attached to an outer periphery of the body to be measured and the ring is subjected to tension by the clamping device, so that the elastic layer and measuring tape form external layers over the body.

13. An angular position measuring system for measuring a body to be measured, the system comprising:

a measuring tape having an adjusting device for adjusting a joint between both ends of the measuring tape;

an elastic layer, the measuring tape attached to the elastic layer, the elastic layer elastic in at least a radial direction; and a clamping ring, the elastic layer attached to the clamping ring, the clamping ring having a clamping device for attaching the measuring tape to the body to be measured, wherein the clamping ring is attached to an inner periphery of the body to be measured and the ring is subjected to compression by the clamping device, so that the elastic layer and measuring tape form internal layers within the body.

* * * * *